United States Patent [19]

Trehn et al.

[11] 4,310,890
[45] Jan. 12, 1982

[54] PARKING SYSTEM

[76] Inventors: Karl B. Trehn, Lillgarden, Överby, 150 12 Stjärnhov; Nils H. Swahn, Granevägen 8, 182 65 Djursholm, both of Sweden

[21] Appl. No.: 41,531

[22] Filed: May 22, 1979

[30] Foreign Application Priority Data

May 25, 1978 [SE] Sweden ............................. 7805975

[51] Int. Cl.³ .............................................. G07C 1/30
[52] U.S. Cl. .................................. 364/467; 364/464; 235/92 T; 340/51; 194/DIG. 22; 368/90
[58] Field of Search ...................... 364/464, 467, 569; 235/92 T, 92 TC, 384, 92 AC; 340/51, 43; 58/141, 143; 194/DIG. 21-DIG. 23

[56] References Cited

U.S. PATENT DOCUMENTS

| | | | |
|---|---|---|---|
| 3,166,732 | 1/1965 | Ljungman et al. | 235/92 TC |
| 3,575,586 | 4/1971 | Kroll | 340/51 |
| 3,705,976 | 12/1972 | Platzman | 235/384 |
| 3,775,593 | 11/1973 | Gieringer et al. | 235/92 TC |
| 3,815,718 | 6/1974 | Singer | 235/92 TC |
| 3,867,615 | 2/1975 | Sioufi | 235/92 TC |
| 3,948,375 | 4/1976 | Selby, Jr. | 340/51 |
| 3,952,850 | 4/1976 | Andersson et al. | 340/51 |
| 3,959,632 | 5/1976 | Trehn et al. | 235/92 AC |
| 4,031,991 | 6/1977 | Malott | 340/51 |

Primary Examiner—Mark E. Nusbaum
Assistant Examiner—Gary Chin
Attorney, Agent, or Firm—Burns, Doane, Swecker & Mathis

[57] ABSTRACT

A parking system for vehicles is disclosed. The system includes a special sign that displays information about a particular parking space, a parking meter into which the displayed information is entered that accumulates parking information in accordance with the entered displayed information, and a terminal that receives and process the parking information accumulated by the parking meter.

8 Claims, 10 Drawing Figures

PARKING SYSTEM

FIELD OF THE PRESENT INVENTION

This invention relates generally to parking systems, and more particularly to a parking system for motor vehicles.

BRIEF DESCRIPTION OF THE PRIOR ART

Service purchasing systems are known which permit a purchaser to purchase a service, for example, to purchase the use of a parking space. One such system includes a first device which is at the disposal of the purchaser, and a second device which is not at the disposal of the purchaser. The first device stores information about the service purchased by the purchaser, and the second device retrieves and processes the information stored in the first device. Each device includes a decoding instrument which identifies one device to the other, and allows data to be transferred between the devices.

SUMMARY OF THE PRESENT INVENTION

The present invention utilizes a parking meter at the vehicle owner's disposal for storing information, a terminal for evaluating the information stored in the parking meter, and a special sign that displays information needed by parking meter about the particular parking space in order to provide an effectively workable parking system.

A parking system for motor vehicles in accordance with the present invention, in comparison with coin operated parking meters or automatic ticket systems in which coins must be introduced or deposited at a central parking meter or in the parking lot on every occasion, has the advantage that it can function as an advanced payment system. Once the parking meter is fed with information, the present system can be used without any need for coins.

As far as the differences in the economic accounting between a parking meter functioning under coin introduction or an automatic ticket system and the present system, it is totally evident that in the former parking- or automatic ticket-systems coins must be collected, which means that coins must be gathered and counted.

According to the present invention accounting can be performed in such a way that upon the "loading" or filling of the parking meter's main storage device at the terminal, an amount is payed for the information so loaded in accordance with the principle of advance payment. When the parking meter is brought back to the terminal after having been used, the information contained in the parking meter is evaluated at the terminal, and through this information the accounting can take place in a simple way. It is also possible by the accounting, to differentiate between a plurality of payment receivers who are due payment for services rendered at various parking occasions. The accounting system becomes significantly easier through this procedure. Moreover, the present system can be utilized with or without advanced payment.

The present invention provides for greater flexibility for motorists as well as for payment receivers than with the previously known parking system, as illustrated by the tables.

Table 1 indicates the flexibility that the present system gives to the payment receiver. Table 2 shows the flexibility that the present system provides for the motorist.

TABLE 1

| Flexibility | A central or mounted parking meter with coin introduction. | A system according to the present invention. |
|---|---|---|
| Parking costs. | Change in the introduction of coins, time mechanism or exchange of whole meter. | Change of a given information attached to the sign. |
| Maximum parking time allowed. | Change of sign information. | Change of a given information attached to the sign. |
| New payment receiver. | Eventual exchange of available equipment. | Change of a given information attached to the sign. |
| Physical placement of parking space. | Putting up, or removal of central or mounted parking meter, ticket automats, and signs. By tickets automats, even new installation. | Putting up, or removal of sign alone. |
| Index regulating | In practice not possible to carry out with existing products. | Decisions upon new price takes place by changing information (code) on the sign, or only by public announcement of index raise for all rates. |
| Amount of flexibility | Circumscribed flexibility at considerable costs. Mechanical or electronic changes in the meter and the automats. | High flexibility to limited costs. None invervention in the meter and/or the terminal. |

TABLE 2

| | | |
|---|---|---|
| How long time should the parking last, what does it cost? | The motorist must decide parking time and pay therefore which may lead to overpayment, or to the risk of getting a parking ticket. | The parking time does not have to be decided previously. Payment is made only for the time utilized. |
| How is payment made? | Often, the motorist doesn't have the proper coinage, and a "valid" ticket can't be obtained. | The motorist is independent of change coins, and gets a receipt for parking costs when the meter is "charged" at the terminal. |
| Handling, and convenience? | Different procedures with different parking places, and with different payment receiver. Often inconvenient because the motorist must walk a long distance to get the parking receipt and return it to the car. | Simple handling. The parking meter is utilized in the same way on all parking places, including those with different payment procedures. |

It is an object of the present invention to solve the difficult problem of so called farmer parking in the inner city. The present invention makes it possible to allow the automobile to stay in a particular housing area the whole day and night simply by introducing the information given by the sign into the parking meter.

It is another object of this invention to construct the parking meter in such a manner that the personnel in charge of the parking area can, with the help of a signal control unit, determine if the parking meter is functioning and if the correct displayed information has been entered into the parking meter.

BRIEF DESCRIPTION OF THE ACCOMPANYING DRAWING

The preferred embodiment of the present invention is described with reference to the accompanying drawings in which.

DESCRIPTION OF THE PREFERRED EMBODIMENT

The present invention utilizes three interrelated but physically separated units, as follows:

(a) a sign for indicating a parking space, (b) a parking meter pertaining to, and/or at the disposal of, the vehicle, and (c) a terminal, from which the information accumulated in the parking meter can be evaluated.

According to the present invention, the sign associated with a parking space displays information (for example, a tariff number) about the parking space. The information is displayed in coded form and includes information about at least one of the following criteria:

(i) maximum length of parking time (ii) cost per unit of time or occasion, (iii) who is or are subject to payment (payment receiver) for the utilized time or occasion, (iv) information about who has specific permission to use the parking space.

The parking meter associated with a vehicle or at the disposal of the vehicle's owner, is equipped with a decoding instrument to enable the meter to receive the information from the sign, evaluate its code, and distinguish the criteria represented by the code. The parking meter has the capacity to store the pertinent contents of the parking information. The terminal has the capacity to evaluate the information stored in the parking meter, and distinguish between the information that the parking meter recorded last from that which has been stored during previous parking opportunities.

Figures 1, 2:
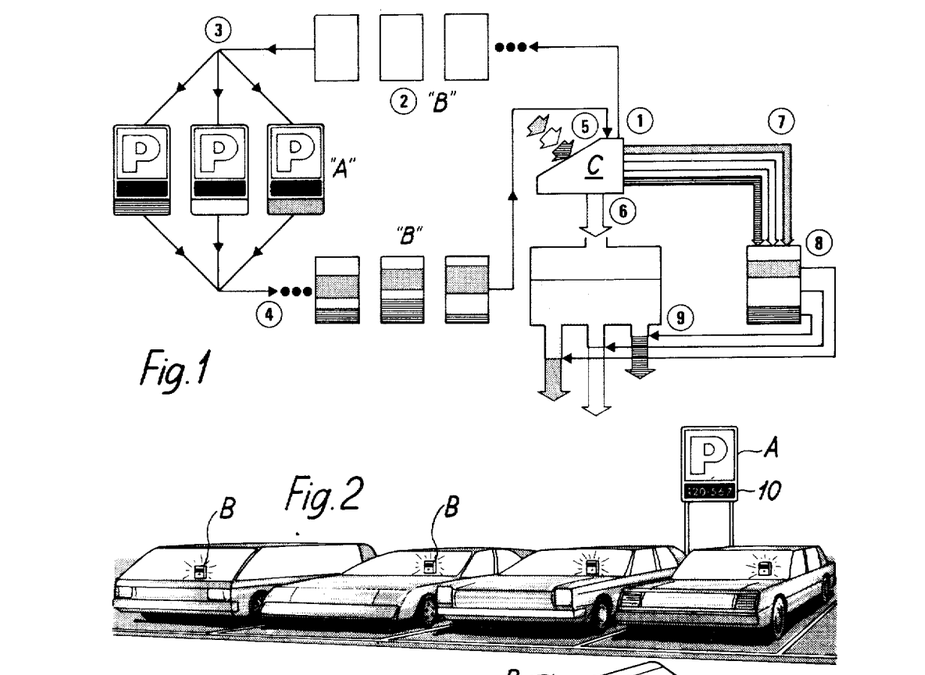
FIG. 1 shows how the three components of the system function with each other, and how it is possible to obtain a simple money flow, and simple accounting thereof.
FIG. 2 shows four parked automobiles each having a parking meter and a special sign displaying significant information.

FIG. 1 illustrates the separate units working together, namely the parking zone or space with its parking zone sign having the reference letter "A", a parking meter "B" associated with the vehicle and/or at the disposal of the vehicle's owner, and a terminal "C".

According to the present invention, the information on the sign will be displayed as a number or cipher containing in coded form the cost per unit of time or per parking occasion for parking in the parking space, as well as other coded information about who has the right to receive payment for the use of the parking space.

The parking meter associated with or at the disposal of the vehicle proprietor contains a data entry device by which information from the sign is entered into the meter and displayed on a cipher indicator. The cipher indicator indicates that the meter is operating according to the sign's information.

A debit's indicator can preferably be built along with the cipher indicator.

The parking meter contains a main memory (main storage device) in which a number of bits or segments of information are stored. In an advance payment system, the number of bits represents the amount of advance payment made. The meter additionally contains one or more accounting memories (sub storage device) to which information segments are transferred from the main memory during parking, in accordance with the sign's information. The transfer is controlled by an electronic time meter and a microprocessor or other electronic circuit included in the parking meter.

With reference to FIG. 1, point 1, it is shown that via the advance payment system the meter is loaded at the terminal "C" with a number of information segements (bits) under identified markings, which represent a predetermined payment. Under a system without advance payment, one could suppose that the information loaded into the main memory is limited. At reference point 2, three parking meters each have their main memory loaded with bits and have their accounting memories set to zero.

At reference point 3 it is assumed that the motor driver parks his vehicle, and then enters into his parking meter the information pretaining to that zone, the so called tariff number, displayed on the special sign. During the period of time in which the vehicle is parked in the parking space, the bits from the meter's main memory are transferred to the accounting memory associated with the payment receiver who is to be payed for use of that parking zone. Reference point 4 illustrates that the three different meters have filled in, to various degrees, their accounting memories from the main memory.

Reference point 5 helps to illustrate that as soon as the impressions begin to exhaust in the main memory, the meter can be recharged at terminal "C".

It is illustrated at reference point 6 that the payment for the utilized impressions is accounted in a special account, while reference point 7 illustrates that terminal "C" is constructed in such a manner that it sets all the accounting memories to zero, and the information obtained from the accounting memories is transferred for data processing. Through this data processing, the motorist's advance payments can be transferred from the impressions to the respective payment receiver. These payments have been displayed at reference point 9.

Figures 3, 4, 5:
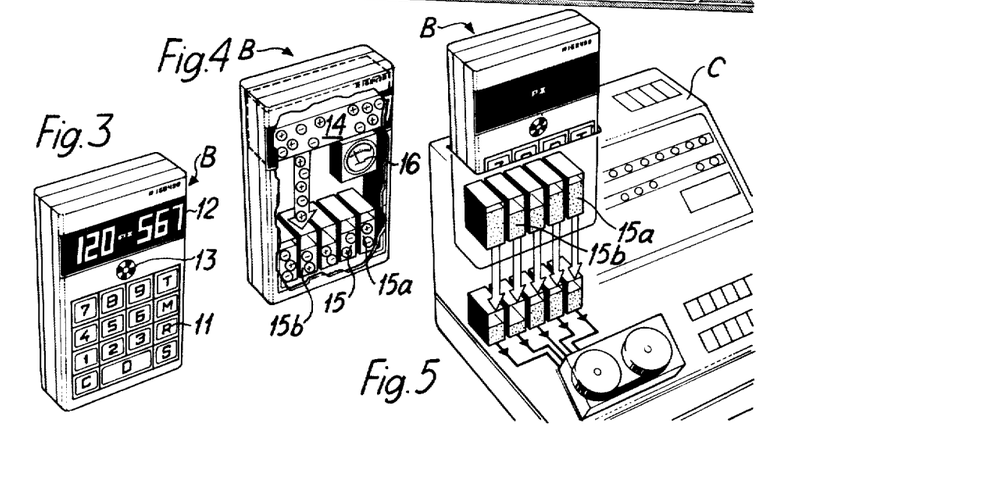
FIG. 3 shows in perspective a parking meter.
FIG. 4 shows a cut of the parking meter shown in FIG. 3.
FIG. 5 shows a relationship between the parking meter and the terminal.

FIG. 2 shows a parking zone with four parked automobiles, each automobile having a parking meter "B", and each meter being set to the information displayed by the illustrated parking sign. Sign "A" displays the cipher "120-567" which is denoted by reference numeral 10. With reference to FIG. 3, a meter "B" is shown in perspective, and to this meter the information 10 can be entered through a data entry device 11. A cipher indicator 12 displays the information. A debit indicator 13, is placed on the meter to show that the meter is functioning and performing according to the sign's information. It is important that during operation the meter be located in a definite spot under the windshield in order to enable verification by the person in charge of the parking area that the debiting is taking place.

FIG. 4 shows a schematic cut of the meter of FIG. 3. This cut view illustrates that during meter operation the impressions (bits) from the main memory 14 are transferred to one, or if so desired, more accounting memories 15, 15a, 15b. FIG. 4 illustrates accounting memory 15b receiving the impressions.

A time meter 16 can regulate the length of the time period or the frequency at which the impressions are transferred from the main memory 14 to the accounting memory 15, since the time meter functions according to the fee information encoded in the tariff number.

The tariff number is displayed on the sign at each parking zone. By way of example, the first digit of the cipher gives the maximum time lenght for parking, and the third and second digits of the cipher give the parking cost, either per unit of time or per parking occasion. The fourth, fifth and sixth digits of the cipher indicate the payment receiver who will collect the parking payments.

FIG. 5 illustrates how a meter is introduced in a terminal "C" and how the terminal evaluates the contents of the accounting memories, as well as how the terminal differentiates the content of these memories in order to be able to begin the successive division of the revenues.

Figure 6:
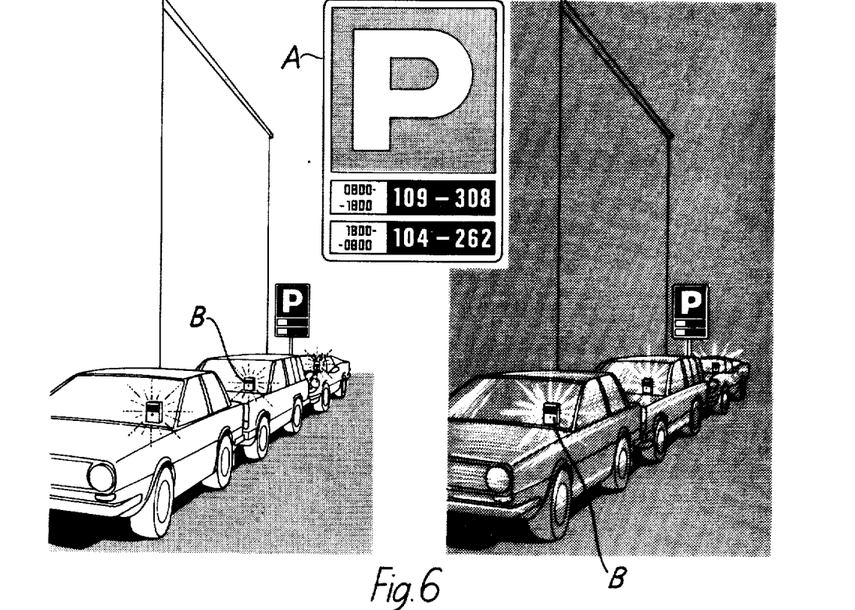
FIG. 6 shows how the present parking system can be used in daytime or nighttime with the help of the special sign.

FIG. 6 shows how the present system can solve the so called problem of resident parking in the inner city. By assigning to the parking zone a certain information or tariff number during the daytime, and another tariff number during the night time, it is possible for the automobile to stay parked in the parking zone around the clock. In FIG. 6, the tariff number for the daytime is illustrated as "109-308", while the evening tariff number is illustrated as "104-262".

Figure 7:
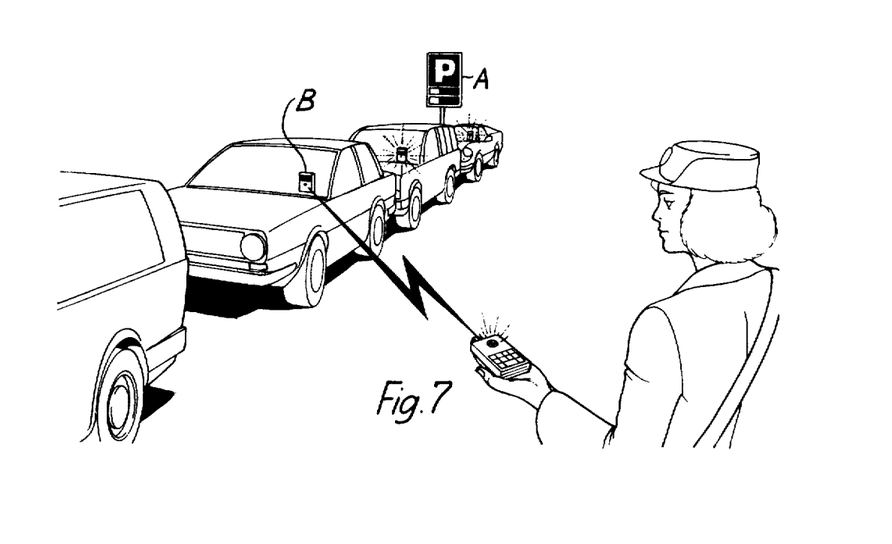
FIG. 7 shows a person in charge of the parking area using a signal control unit to determine if the parking meter is functioning and if the proper displayed information has been entered into the parking meter.

Finally FIG. 7 illustrates the person in charge of the parking area using a signal control unit to determine if the meter is functioning and if the correct tariff number has been entered into the meter.

The above mentioned functions are dependent upon how the meter "B" is contructed, and if all or just a part of these functions are to be utilized. For a detailed description of a particular parking meter reference is made to Swedish Patent Application Number 7901889.

Figure 8:
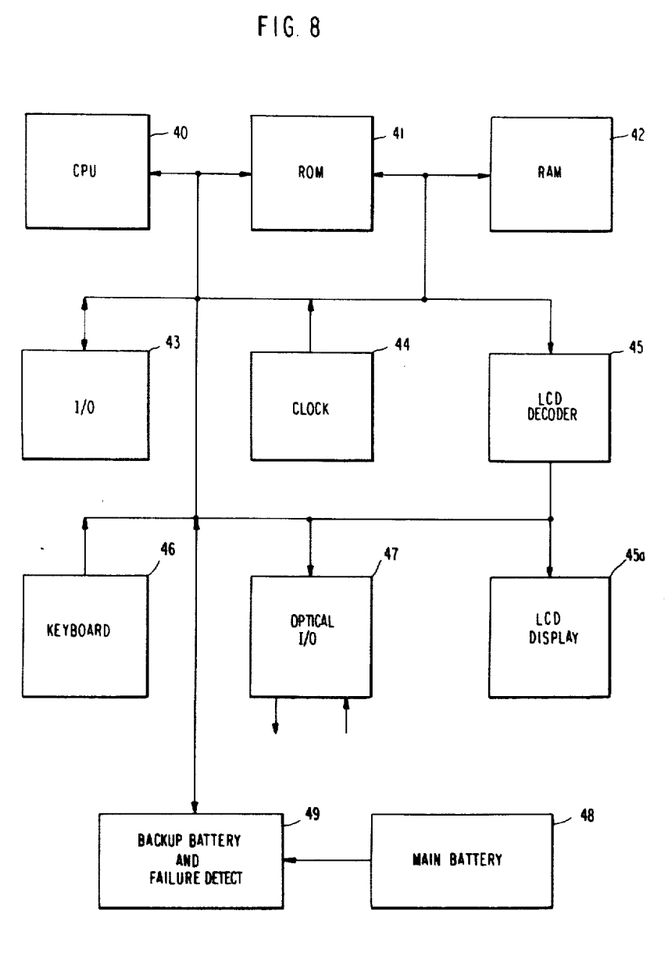
FIG. 8 is a functional block diagram of the circuitry in the parking meter.

Specifically, as disclosed in the application, FIG. 8 shows a functional diagram and a block diagram for the meter in accordance with the present invention. The meter includes a central unit 40 which is connected by means of a bundle of cables to a permanent programmable memory 41. This memory is itself connected to a random access memory 42. A so-called input/output unit 43 is provided to run the central unit 40 and the memories 41 and 42, and a real-time clock 44 is used in view of the fact that the meter is assumed to be so designed as to be capable of making time-related financial transactions.

The reference 45 is used to indicate a de-coder for the digital display. This de-coder is also known as a display de-coder.

A keyboard 46 is required for the control of the operating cycle of the central unit.

An optical link 47 (optical contact) is provided to enable the read-out of information from the memory 42 and to permit the input into the main memory of a number of units of information corresponding to a fee which has been paid.

The de-coder 45 is connected to the actual digital display 45a. Reference 48 indicates a main battery which is connected to a stand-by battery and a fault detector 49.

Figure 9:
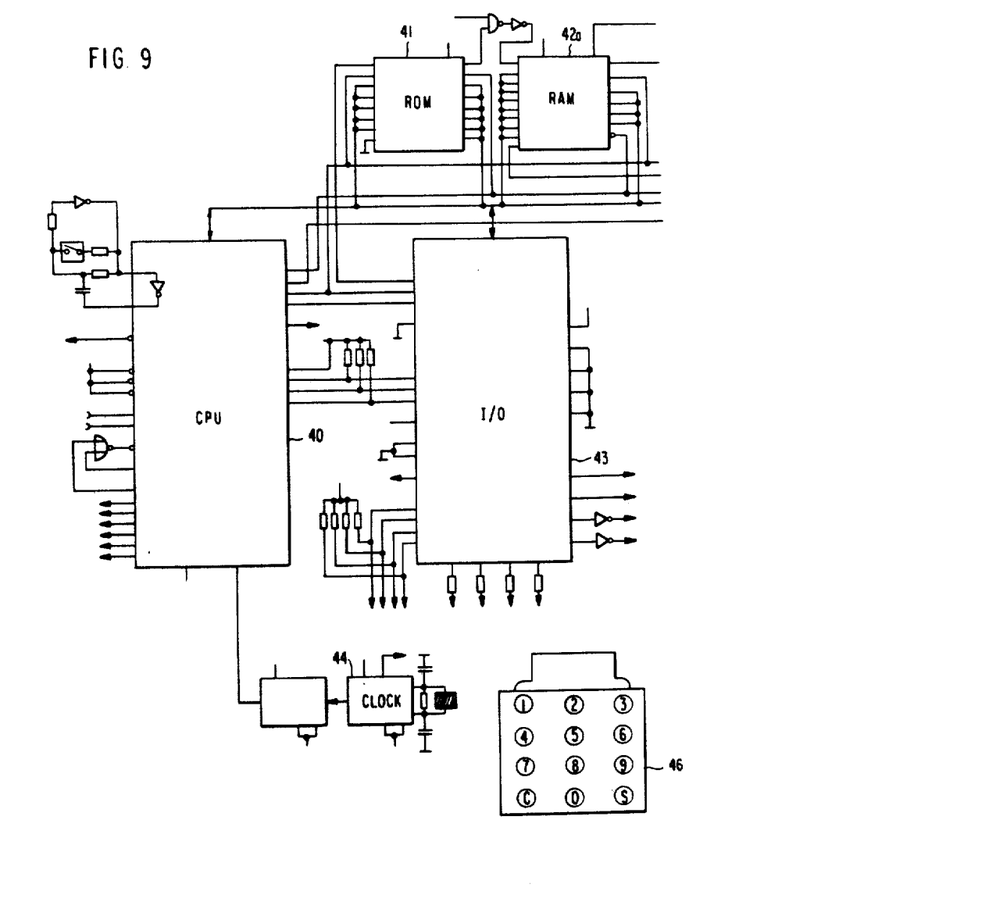
FIGS. 9 and 10 are schematic circuit diagrams of the circuitry in the parking meter.
Figure 10:
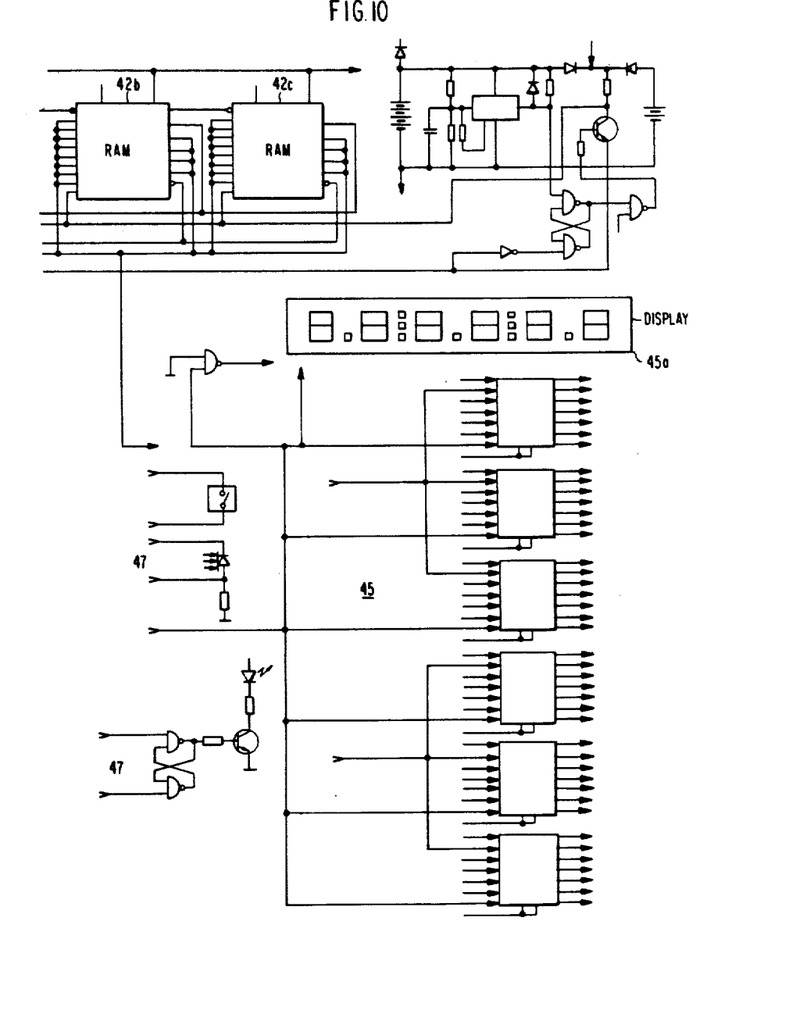

FIGS. 9 and 10 show a more detailed wiring diagram for the meter in accordance with FIGS. 3 and 8.

It may be seen from FIG. 9 that the microprocessor 40 shown in FIG. 8 consists of a microprocessor of the type IM6100 sold by "Intersil". This processor is connected by means of the first bundle of cables to the input/output unit 43, in the form of a unit with the designation IM6101, and is also connected partly by means of the same bundle of cables and partly by means of a second bundle of cables to a programmed memory 41, in the form of a permanent memory consisting of a memory with the designation IM6312.

The input/output unit 43 is connected to a keyboard 46.

The programmed memory 41, with its permanently entered program, is connected to a number of random access memories 42, each of which consists of a unit with the designation IM6561, but of which only one (42a) is shown in FIG. 9, whereas two (42b and 42c) are shown in FIG. 10. A real-time circuit 44 is also shown in FIG. 9.

In addition to the aforementioned random access memories 42b and 42c, FIG. 10 also shows a de-coder 45, input and output circuits 47 for an optical link and a digital display device 45a operating on the liquid crystal principle.

The internal wiring of the above component parts of the device is directly dependent on the following specification, on the basis of which experts in this area will be able to connect up the internal wiring.

FUNCTIONAL SPECIFICATION OF THE METER

The following specification illustrates the function and the construction of the meter when used in conjunction with a parking system of the kind described with reference to FIGS. 1-7.

The system may be used to great advantage by parking companies on a national basis, but also has a more regional application.

The meter is capable of storing the information which is required in the case of parking spaces which are owned or managed by various principles, as well as in the case of parking spaces which are divided up into the following categories depending on their accessibility:

Service parking (S) (includes parking spaces intended for use by the general public);

Permit parking (T) (includes parking spaces which may be used only with the express permission of the principal).

The following are examples of S-parking facilities:
Local authority parking areas in which road traffic regulations apply;
Parking areas for visitors to Government authorities;
Parking areas for visitors to Council and Provincial Government offices;
Parking facilities provided at travel terminals;
Multi-story parking facilities, etc., for use by the general public.

Examples of T-parking are: parking areas at a place of residence, at a place of work, and employees' parking areas. It may be assumed that the number of parking spaces used for T-parking is considerably greater than the number of spaces used for S-parking.

The conditions which govern T-parking are usually controlled by individual or collective agreement. Present-day T-parking is based on a maximum daily charge or on a weekly or monthy rental for a particular parking space.

The meter enables a maximum daily charge to be levied, but without the need to allocate a specific parking space to each motorist.

Each of the principals operating S-parking facilities is allocated an individual, three-digit principal's number which forms part of the information number of the system (the PX-number).

Each of the principals operating T-parking facilities is allocated an individual, six-digit number (the TX-number). In addition to this, the larger operators of T-parking facilities are allocated a three-digit number from the series of numbers used for S-parking facilities, which is to be used for visitors' parking spaces within the T-parking facility.

1. PREMISES WHICH APPLY GENERALLY TO THE METER

1.1 Identification of systems and meter "B" (PX-meter)

The following are some of the respects in which a parking system may differ from other systems:

Each system has its own system association code which is exchanged during communication between a meter and a terminal (the LX-terminal);

The PX-meters in a given system may use a visual symbol to indicate system association;

Every PX-meter in a particular system will have its own individual identity number of 24 bits which is programmed into a special memory 42;

Every PX-meter has a visual serial number so positioned that a supervisor can see the number when the PX-meter is placed in the parked position;

Every PX-meter can be programmed.

Every PX-meter is programmed on first being issued with the year (1 digit, 4 bits) and the week number (2 digits, 8 bits).

1.2 PX-meter memories 1.2.1 Main memory ($M_H$) with reference designation 42

This is a non-permanent memory and, as may be seen from FIG. 9, consists of three separate units 42a–42c. This memory is able to store that number of markers which is in use at any given time, and markers may be added, etc.

The memory selected for the typical embodiment has a maximum capacity of +2047 to −1023, i.e. 3070 markers.

1.2.2 Accounting memory ($M_R$) with reference designation 42

Every principal whose parking facilities have been used at all since the most recent reading of a PX-meter was made for accounting purposes will have an accounting memory at his disposal in the PX-meter until the date of the following reading for accounting purposes.

The accounting memory contains the principal's code, which has available 3 coded decimal digits, as well as a number of markers which are deducted from the main memory when the principal's code is entered.

The $M_R$ is scanned each time the PX-meter is inserted into the terminal and the resulting information may be read into the terminal unit.

Every accounting memory has sufficient capacity for a quantity of markers which is greater than or equal to 3070, and the accounting memories can be eight in number.

1.2.3 Permit memory ($M_T$) with reference designation 42

In order for parking to be permitted in spaces for which the express permission of the principal is required, the TX-number relevant to that permit parking facility must be programmed into a permit memory.

The TX-number identifies the principal, and the six-digit number will commence with either and 8 or 9. The permit memories can be three in number.

Every permit memory is capable, with the help of an individual programming unit, of being programmed with the following details:

| | |
|---|---|
| Principal | 8 or 9 followed by 5 figures |
| Time limit for permit | 1 figure (0–9) |
| Tariff number A | 3 figures (0–7 for posn. 1 + 2 figures for posn. 2 and 3) |
| Period for tariff number A | 4 figures |
| Tariff number B | 3 figures (as for tariff no. A) |
| Period for tariff number B | 4 figures (00–24) |
| Maximum daily charge (whether or not collected) | A symbol. |

The maximum charge is determined by the tariff number or by the tariff number together with its time interval.

The reference code used to indicate the time limit for the permit is checked during communication between the PX-meter and the LX-terminal. Once the point in time at which the permit ceases to be valid has been passed, the permit in question will be erased and the motorist will be advised of the change when he goes to the LX-terminal (i.e., details of the permit which has been withdrawn). The three-digit tariff numbers and any time intervals which are associated with them will determine the sum debited against the accounting memory to which the respective TX-number relates.

The three permit memories are allocated the following principal's codes (corresponding to positions 4–6 in a six-digit PX-number in an S-parking facility), i.e. the accounting memory is programmed identically to the corresponding T-memory when it is used in connection with a parking facility.

| | |
|---|---|
| Permit memory 1 | Principal's code 001 |
| Permit memory 2 | Principal's code 002 |
| Permit memory 3 | Principal's code 003 |

The parking fee is governed by the maximum charge per day or per part of a day in the same way as the maximum daily charge in an S-parking facility.

A maximum permitted parking period is rarely encountered in T-parking facilities. Where the tariff number has a group code 0 or 1, this indicates that the maximum permitted parking period (tariff number position 3) is governed in a similar fashion to the maximum period in an S-parking facility with the same tariff number.

During communication between the PX-meter and the LX-terminal, and where the accounting memories have been allocated principals' codes 001, 002 or 003, a reading is taken of the TX-number contained in the permit memory relating to the respective principal code, which is then recorded in the LX-terminal together with the number of PX-markers.

1.2.4 Time memory ($M_K$) with reference designation for the clock 44 via 40 to 42

The time is accounted for in the PX-meter in a time memory. A clock signal is generated by the clock 44 and is fed by the processor 40 to the memory 42.

| $M_K$ | memory capacity | |
|---|---|---|
| — | Minutes | 00–59 |
| — | Hours | 00–23 |
| — | Week number (8 bits) | 01–53 (week 1 = 1st Monday in Jan) |
| — | Weekdays | 1–7 (Monday = day 1; Tuesday = day 2, etc.) |

During communication between the PX-meter and the LX-terminal, the accuracy of the crystal oscillator is checked and the times shown above are corrected to their true values. The PX-meter should be replaced if the crystal oscillator has produced an error greater than 2 minutes per month.

$M_K$ is "frozen" in position when the PX-meter is switched off. This may occur if the date is exceeded and on instruction by the LX-terminal.

1.2.5 Memory for regional association of LX-terminal ($M_{LX}$) with reference designation 42

The PX-meter stores the week number and the regional association of the LX-terminal on the most recent visit.

| Memory capacity | |
|---|---|
| Regional number of LX-terminal | figure 0–9 |
| Week number | figure 00–53 |

These details are programmed into the PX-meter from the LX-terminal.

1.2.6 Memory for switching off before LX-visit ($M_A$) with reference designation 42

The PX-meter is switched off to prevent its use in connection with parking for various reasons until the LX-terminal has been visited; these reasons include:

need for battery replacement, i.e., the programmed week number ($V_B$) has been exceeded. $V_B$ is programmed into the PX-meter from the LX-terminal each time the battery is replaced;

need for accounts to be updated, i.e., the programmed week number ($V_R$) has been exceeded. $V_R$ is programmed into the PX-meter from the LX-terminal each time the accounts are updated.

The capacity of the $M_A$ memory for $V_B$=01 to 53

The capacity of the $M_A$ memory for $V_R$='to 53

Switching off of the PX-meter will not take place in the P-position for the reasons referred to above.

The PX-meter will give an advance warning signal in both cases ("warning condition" will appear on the display) for an LX-visit 2–4 weeks before $V_R$ and $V_B$ respectively.

Other reasons for switching off before a visit has been made to the LX-terminal include:

main memory has a negative value (no switching off in P-position);

main memory has reached its maximum negative value in P-position;

power supply failure in P-position (B-cell to be used);

power supply failure in P-position (B-cell used).

In order to facilitate the resolution of legal disputes between principals and the holders of PX-meters in the event of incorrect parking, the point in time at which the PX-meter was switched off—for whatever reason—shall be "frozen" in the time memory $M_K$.

On future visits to the LX-terminal, a record is made of the serial number of the PX-meter together with details of the time at which it was switched off, the reasons for switching off and any subsequent steps which were taken, e.g. replacement of the PX-meter for service or steps taken to correct the reason for switching off.

1.2.7 Memory for PX-markers used ($M_{PX}$) with reference designation 42

The memory is designed to accumulate the total number of PX-markers entered into the H-memory and also to indicate the elapsed time or the numbers of markers accumulated since the start.

$M_{PX}$-capacity:

Total number of PX-markers in the H-memory (in hundred) 0–256.

2. STRUCTURE AND SIGNIFICANCE OF INFORMATION NUMBERS USED IN THE PX-SYSTEM

The six-digit number on PX-sign "A" shows details in coded form relating to the conditions of parking and the identity of the principal operator of the parking facility. The information number has the following designation and is made up of the serial numbers below:

S-parking: Space and charge number = PX-number 000.000–799.000

T-parking: Permit number = TX-number 800.000–999.999

2.1 PX-number for S-parking (000.000–799.999)

The PX-number consists of two three-digit groups with the following designations.

| Tariff number: | Group of figures in positions 1–3 |
|---|---|
| Number for principal operator of S-parking: | Group of figures in positions 4–6 |

2.1.1 Tariff number (Position 1–3)

The tariff may adopt any value between 000–799 and the position of the figures is as follows:

| Position 1 | Group code | (0–7) |
|---|---|---|
| Position 2 | Charge rate code | (0–9) |
| Position 3 | Maximum time/price code | (0–9) |

The parking charge per unit of time, the maximum period for which a vehicle may be parked and the maximum charge per day or per part of a day may vary both according to the time of day and depending on the day of the week. Group codes 0–7 are used in order to:

vary the parking charge per unit of time (position 2);

determine whether maximum period or maximum charge shall apply (position 3);

provide different tariffs for days of the week 1–5 and 6.

2.1.1.1 Charge rate code. Parking charge per unit of time (position 2).

The parking charge per unit of time is shown in Tables A and B below in terms of dollars per hour and the period length is shown in seconds for a PX-marker.

The Tables were compiled on the basis of a basic period length $B_P$=3 seconds. N indicates the number of basic periods $B_P$ in a single marker. $N \times B_P$= the period length in seconds for a single marker at the respective charge rate. The cost of a marker = 10 cents.

TABLE A

| No. | dollars/hour | length of period sec/marker |
|---|---|---|
| 0 | 0 | |
| 1 | 0.10 | 3600 |
| 2 | 0.015 | 2400 |
| 3 | 0.20 | 1800 |
| 4 | 0.25 | 1440 |
| 5 | 0.30 | 1200 |
| 6 | 0.40 | 900 |
| 7 | 0.50 | 720 |
| 8 | 0.75 | 480 |
| 9 | 1.00 | 360 |

TABLE B

| No. | dollars/hour | length of period sec/marker |
|---|---|---|
| 0 | 1.50 | 240 |
| 1 | 2.00 | 180 |
| 2 | 2.50 | 144 |
| 3 | 3.00 | 120 |
| 4 | 4.00 | 90 |
| 5 | 5.00 | 72 |
| 6 | 6.00 | 60 |
| 7 | 8.00 | 45 |
| 8 | 10.00 | 36 |
| 9 | 12.00 | 30 |

Table A applies to group numbers 0, 2, 4 and 6
Table B applies to group numbers 1, 3, 5 and 7

The figures which appear in the columns headed "No." in the Tables are also to be found in position 2 of the tariff number. The charge rate code is thus made up partly of the group number and partly of the number in position 2.

2.1.1.2 Code for the maximum parking period (position 3)

A maximum period of parking is used mainly in order to control the rate of occupancy of the respective parking spaces (max. period = 4 hours). The maximum period of parking may also be used to control the duration of the longest period during the day for which a fee is charged (max. period = 10 hours).

TABLE C

| No. | maximum period | Visual marking | Notes |
|---|---|---|---|
| 0 | 1–15 min. | (white) | Targe time. Programmable. |
| 1 | 0.5 hours | red | |
| 2 | 1 hour | yellow | |
| 3 | 2 hours | grey | |
| 4 | 4 hours | green | |
| 5 | 10 hours | — | |
| 6 | 12 hours | blue | |
| 7 | 14 hours | — | |
| 8 | 24 hours | — | |
| 9 | no limit | | |

Table C applies to group numbers 0 and 1.

The figures which appear in the column headed "No." in Table C are also to be found in position 3.

The code for the maximum parking period is thus made up partly of group numbers 0 or 1 and partly of the number in position 3.

2.1.1.3 Code for the maximum charge per day or part of a day (position 3)

Parking spaces which are not used on the basis of a maximum parking period will frequently have a maximum charge per day or per part of a day. The maximum charge may be levied in the form of a once-only charge, i.e., the full daily rate (or the rate for part of a day) is charged on the first occasion on which a vehicle is parked on that particular day. No additional parking fee will then be charged for the rest of the day, even though the vehicle may occasionally leave the parking space in question (applies only to T-parking).

A maximum charge may also be levied during a specific number of hours on the basis of an hourly rate which is determined partly by the group code which appears in position 1 and partly by the charge rate number shown in position 2. The number of hours may be seen in Table D.

TABLE D

| No. | Number of hours for which an hourly rate is charged |
|---|---|
| 0 | once-only charge |
| 1 | 1 hour |
| 2 | 2 hours |
| 3 | 3 hours |
| 4 | 4 hours |
| 5 | 5 hours |
| 6 | 6 hours |
| 7 | 7 hours |
| 8 | 8 hours |
| 9 | 24 hours |

Table D applies to groups 2–7, and the figures which appear in the column headed "No." in the Table are also to be found in position 3 of the tariff number.

The once-only charge means that the hourly rate in accordance with positions 1 and 2 is payable immediately (within 10 minutes).

The maximum charge per day or per part of a day shall apply only to uninterrupted parking during the period for which the charge has been levied. As one day becomes the next (at 00.00 hours), any maximum charge which has been levied for the previous day or any fee paid for parking which is continuing at the changeover point between one day and the next will be cancelled. The maximum charge for the new day is levied with effect from 00.00 hours.

The maximum charge for part of a day may be levied no more than two times on any one day (including separate maximum fees) on condition that none of the time intervals relating to the respective charge includes the time 00.00 hours.

If a maximum charge is levied for time interval which includes the changeover point between one day and the next, then the maximum charge for the time interval in question may be levied only in the form of the hourly rate multiplied by the number of hours which make up the time interval in question.

2.1.1.4 Group code (position 1)

The group code may include the FIGS. 0–7.

Group 0–1 is used in conjunction with S-parking facilities in which each individual parking space is subject to a maximum period of use. The value of the maximum period may be seen from Table C. The charge rate in dollars per hour is determined in the case of Group 0 from Table A, and in the case of Group 1 from Table B. Group 0–1 may be used on all days of the week (days 1–7).

Group 2–3 is used in conjunction with S-parking facilities in which each individual parking space is not subject to a maximum period in order to increase use, but may be subject to a maximum charge per day or per part of a day. Group 2 uses the charge rates shown in Table A, and Group 3 uses those shown in Table B. The maximum daily charge is shown in Table D. Group 2-3 may be used on all days of the week (days 1-7).

Group 4-5 is used in conjunction with S-parking facilities as described in Group 2-3 above, with Group 4 using a scale of charges in accordance with Table A and Group 5 using a scale of charges in accordance with Table B. Group 4-5 may be used only from Monday to Friday (days 1-5).

Group 6-7 is used in conjunction with S-parking facilities as described in Group 2-3 above, with Group 6 using a scale of charges in accordance with Table A and Group 7 using a scale of charges in accordance with Table B. Group 6-7 may be used only on day 6 of the week.

When used in conjunction with S-parking facilities, Groups 2-7 are intended to permit parking for a period which may, for instance, extend over a weekend or for a longer period without the end to re-set the PX-meter, by utilizing programmed time intervals which determine the tariff numbers which will be charged at different times of the day.

2.1.2 Principal's code for S-parking facilities (positions 4-6)

Each of the principal operators of an S-parking facility is allocated an individual three-digit principal's code between 000–999, which is programmed into positions 4-6 of the PX-meter when parking takes place.

2.2. TX-number for T-parking facilities (800.000-999.999)

The six-digit TX-number (with an initial FIG. 8 or 9) is a principal's code and appears on a sign displayed at the parking space, which may only be used with the permission of the principal.

When in the P-position, the display of the PX-meter will show this TX-number only on condition that the TX-number in question has been programmed into the permit memory ($M_T$) of the PX-meter. Also programmed into the $M_T$ are the tariff number and the time interval which govern the parking charge per unit of time and the maximum charge per day or part of a day, as well as any parking restrictions which apply during part of the day or on certain weekdays. The tariff number has three digits and is structured in the same way as tariffs for the PX-numbers. The information contained in $M_T$ governs the transfer of the PX-markers from the H-memory to the R-memory (from the main memory to the accounting memory).

When in the parking position, the display will indicate the appropriate TX-number on condition that no restriction has been imposed on the right to park. In this case, the display will indicate 000.000 if parking is taking place during a prohibited period.

The distribution of the TX-numbers across geographical regions, the type of parking (place of work, place of residence, employees' parking, etc.) and the type of parking building may be selected at random.

3. COMPONENT PARTS OF THE PX-METER 3.1 Crystal oscillator with reference designation 44.

The crystal determines the accuracy with which the time is indicated by the clock. It should be accurate to less than ±2 minutes per month.

The clock time appears on the display when the PX-meter is in the base condition, with the hour (00-23) and the minutes (00-59) in positions 2-5 on the display.

The necessary time information (see section 1.2.4) is stored in the time memory $M_K$.

A check is made via the LX-terminal to ensure that the accuracy of the crystal oscillator has been within 2 minutes per month. The information contained in the time memory is corrected to indicate the true time.

3.2 Start switch

The PX-meter changes only when in the P-position, i.e. when it is inside the vehicle and suspended from a PX-meter attachment point on the sun visor.

The start switch is in the form of a magnetic contact inside the PX-meter.

Debiting of the markers from the main memory and recording of the parking period which is to be debited against the time limit contained in the tariff number may only take place if the magnetic contact has been closed for an uninterrupted period of $t_a$ minutes (target time). $t_a$ is capable of being programmed in "one-minute intervals" and can range from 0 to 15 minutes.

Parking is regarded as having ended if the magnetic contact has been interrupted for a period of 1 minute. Debiting of both markers and time stops once the magnetic contact has been interrupted. If the magnetic contact is re-made within one minute and if there has been no new programming, then debiting of both markers and time will continue as before.

Once the magnetic contact has been broken, the displays will show the actual tariff number in the P-position for the first minute.

If a correction key is depressed twice whilst the magnetic contact is interrupted, then the PX-meter will return to the "base" condition of the holding position.

3.3 Interface between PX-meter and LX-terminal

Communication between the PX-meter and the LX-terminal takes place via an optical link and/or two-way wiring. The communication procedure requires that the system associated requirements be met before the communication may be approved and registered.

The PX-meter is locked into the LX-terminal (LX-position) once the communication has been approved and registered.

When in the LX-position, the requirements of the PX-meter in relation to the LX-terminal are described in the following section.

3.3.1 PX-meter in base condition;
3.3.2 PX-meter in warning condition;
3.3.3 PX-meter switched off for visit to LX-terminal;
3.3.4 PX-meter in "dead condition" or faulty.

3.3.1 PX-meter in base condition

When in the base condition, the display of the PX-meter shows the "true" time—in hours and minutes. The time is shown in positions 2-5 on the display.

The relationships between PX- LX may vary in the following sequence (communication ready):

1. The identity number of the PX-meter is checked if the locking unit is connected to the LX-terminal. (Alternatively: the visual serial number of the PX-meter is entered via the keyboard of the PX/LX-reader and checked against the central locking arrangement).

2. The PX-meter memories contained in the random access memory (item 42) are interrogated and these shall be programmed into an equivalent memory in the LX-terminal.

3. The "client" display of the LX-terminal automatically shows the number of markers contained in the $M_H$.

4. At the request of the client, the "client" display of the LX-terminal may also show the content (programming) of the permit memories 001–003;

the content of the memory relating to the consumption of PX-markers ($M_{PX}$).

5. Checking the interrogation of the following PX-memories after they have been transferred to LX-terminals:

Permit memories
Accounting memories
Time memory, together with recordings and programming changes attributable to the above.

6. Inspection of internal and external components, table values which have been programmed, and functions.

7. Ready signal for input of PX-markers into the main memory.

8. Input of PX-markers. LX client display will automatically show the new PX-marker values contained at the main memory. The starting value of the main memory may also be shown on request.

9. The total number of PX-markers, in units of one hundred markers, fed into the main memory is accumulated in the memory for the PX-markers which have been used ($M_{PX}$). The LX-terminal is programmed in such a way that when the accumulated value of markers in the PX-meter exceeds A units of 100 markers (40 A 128), then the number of weeks over which the markers were used will be recorded. The accumulated value of PX-markers in the $M_{PX}$ will be reduced by A at the same time as the transaction code and the week number are programmed into the $M_{PX}$.

10. The ready signal in the PX-reader indicates that the PX-meter has been checked and is ready for issue to the client. A special completion contact in the PX-reader will release the PX-meter from the LX.

3.3.2 PX-meter in warning condition

The PX-meter shows the warning condition on the display only when it is in the holding position. The display then shows in positions 3–6 the number of PX-markers contained in the main memory.

The warning condition is shown for the following reasons:

$M_H$ contains—250 PX-markers;
$M_R$ contains—1 memory which is not in use;
Batter replacement required within—3 weeks;
Updating of accounts in the LX-terminal required within—3 weeks.

The relationships between PX-LX may vary in the following sequence (communication registered):

1. The identity number of the PX-meter is checked if the locking unit is connected to the LX-terminal.
2. The "client" display of the LX-terminal shows reasons for warning condition.
3. Batteries to be replaced, if required.
4. The relationships may vary in the sequence indicated in section 3.3.1 with the PX-meter in its base condition, items 2–10.

3.3.3 PX-meter switched off for visit to LX-terminal

The display indicates the FIG. "8" in positions 1 and 6 when the PX-meter is switched off.

The PX-meter may be switched off in its holding position for the following reasons:

Time limit for battery replacement exceeded;
Time limit for updating of accounts exeeded;
$M_H$ has a negative value;
Battery space has been opened.

The PX-meter may be switched off in the P-position for the following reasons $M_H$ has reached its maximum negative value;
Batteries providing insufficient operating power (B-cell brought into use).

The relationships between PX—LX may vary in the following sequence (communication registered):

1. The identity number of the PX-meter is checked if the locking unit is connected to the LX-terminal.
2. The LX-terminal will check the reason for switching off and will indicate the reason on the "client" display together with the point in time at which switching off took place. The reason for switching off, the time of switching off, the identity number of the PX-meter and the date of the LX-visit together with any measures taken are recorded in the LX-terminal.
3. Batteries to be replaced, if required.
4. The relationships may vary in the sequence indicated in section 3.3.1 with the PX-meter in its base condition.

3.3.4 PX-meter shows "dead condition" or some other condition on the display

No communication between PX—LX can be registered in this position, and the operator of the LX-terminal is required to proceed in accordance with specific instructions.

3.4 PXE control electronics

The control electronics consist of a microprocessor and/or a custom-design-circuit and ROM and RAM memories. The function of the control electronics is determined partly by the above specification and partly by the functional description which follows.

3.5 "Back-up" battery for RAM memory 42

The aim of the back-up battery (the B-cells) is to guarantee that the information contained in the RAM memory 42 will not be lost in the event of failure of the operating voltage or of the A-batteries becoming discharged.

The A-batteries and the B-cells shall be connected in such a way that in the event of the voltage supplied by the A-batteries falling below the voltage of the B-cells, then the B-cells will take over the supply of power. The internal clock is be "frozen" and the PX-meter switched off until a visit has been made to the LX-terminal, even though the operating voltage may be at a sufficiently high level.

The B-cells should last for the service life of the PX-meter, which is —5 years, and are situated within a totally enclosed space inside the casing.

4. FUNCTIONAL DESCRIPTION OF THE PX-METER

This functional description presents the logical sequence in which the PX-meter operates and the changes which may be made to the PX-meter, and is of use to those who use the system-PX-holders and principal operators of, the parking facilities.

4.1 Concepts and definitions used in the functional description

| Positions of the PX-meter | |
|---|---|
| PX-meter in P-position | The PX is attached to the sun visor of the vehicle with the magnetic contact in the closed position; |
| PX-meter in V-position | The PX-meter is at rest or is being programmed before being set in the P-position; |
| PX-meter in LX-position | The PX-meter is locked into the LX/PX-reader. |

-continued

| Condition of the PX-meter | | | |
|---|---|---|---|
| Condition | Explanation | Display Shows | Explanation |
| Dead condition | Operating batteries not working | — | |
| Base condition (H) | PX-meter ready. Not programmed for parking | 13.04 | Time (posn. 2-5) |
| Ready condition (R) | S-key depressed - one single depression | . | Only points are visible |
| Information condition (I) | 6-digit tariff number entered | 142.020 | PX-number or TX-number |
| Information condition (I) | 4-digit time interval entered | 08.18 | Time interval 08.00-18.00 (posn. 2-5) |
| Warning condition (V) | Warning "visit LX-terminal" appears | 0.946 | Marker in main memory (posn. 3-6) |
| LX-condition | PX-meter switched off "will only start after visit to LX" | 8.8 | (posn. 1 & 6) |
| Programme condition (Pr) | S-key depressed two depressions | 1.224 | |
| | | | PX-markers |
| | | 123.202 | PX(TX)-number |
| | | 08.18 | Time interval |

4.2 PX-meter in V-position

The PX-meter is ready for programming if the display shows "base condition" (time) or "holding condition" (main memory marker).

After two depressions of the S-key, the display may move from "base condition" to show "number of PX-markers". "PX-markers" will continue to be displayed if the key is depressed more than twice. The display will return to "base condition" if the C-key is depressed twice.

4.2.1 Programming of the PX-meter for S-parking

| Condition | Display/shows/-measure | Explanation | P-position |
|---|---|---|---|
| H-condition (warning condition) | 08.10 | time by the clock (PX-marker) | |
| | S-key (single depression) | . | |
| K-condition | . | | |
| | Number keys (6 figures) | | |
| I-condition | 123.456 | PX-number | |
| | S-key (single depression) | | |
| | | | A. to P-position PX meter works with number 123.456 |
| K-condition | . | | |
| | Number keys (4 numbers) | | |
| I-condition | 08.18 | Time interval (123.456 applies between 08.00-18.00 | |
| | S-key (single depression) | | B to P-position 123.456 08-18 000.000 18-08 |
| K-condition | . | | |
| | Number keys (6 numbers) | | |
| I-condition | 016.456 | PX-number | |
| | S-key (single depression) | | C. to P-position 123.456 08-18 016.456 18-08 |
| K-condition | . | | |
| | Number keys (4 numbers) | | |
| I-condition | 18.22 | Time interval (016.456) applies between 18.00-22.00 | |
| | | | D. to P-position 123.456 08-18 016.456 18-22 000.000 22-08 |
| K-condition | . | | |
| | No more numerical information may be entered into the PX-meter. S-key (second depression) | | |
| Pr-condition | 0.801 | PX-marker | |
| | S-key (single depression) | | |
| Pr-condition | 123.456 | PX-number | |
| | S-key (single depression | | E. to P-position 123.456 08-18 016.456 18-22 000.000 22-08 |
| Pr-condition | 08.18 | Time interval | |
| | S-key (single depression) | | |
| Pr-condition | 016.456 | PX-number | |
| | C-key (single depression) | | F. to P-position PX-meter to base condition |
| Pr-condition | . | Correction of PX-number | |
| | Number keys (6 numbers) | | |
| Pr-condition | 026.456 | PX-number | |
| | S-key (single depression) | | |
| Pr-condition | 18.22 | Time interval | |
| | S-key (single depression) | | G. to P-position 123.456 08-18 026.456 18-22 000.000 22-08 |
| | 0.801 | PX-marker | | etc.

PXE in the V-position will always operate with the following logic

1st information condition PX-number (1)
2nd information condition Time interval for PX-number (1)

3rd information condition PX-number (2)
4th information condition Time interval for PX-number (2)

Any depression of the number keys in excess of 6 or 4 times respectively in the above information conditions will be disregarded. Incomplete information in any of the above information conditions will mean that the PX-meter will not operate in the P-position, but will return to the base position.

The PX-meter may be set to the P-position after each item of information is complete.

Any depression of the S-key will be disregarded if the information is incomplete.

Two depressions of the S-key are used to indicate that the input of information is complete, and that the PX-holder wishes to be advised of what has been programmed-in. The PX-meter will then go to the "program condition" (Pr-condition).

When in the Pr-condition, the display will first show the PX-marker content of the $M_H$, and will then "leaf through" every time the S-key is depressed to show I-condition 1, 2, etc. Once the most recently entered item of information has been shown, the display will return to the number of PX-markers, etc., after the S-key has been depressed.

A single depression of the C-key, when the display is showing the information condition, will remove the information from the PX-meter (display will indicate ready condition) and new information may then be entered. Corrections may be made to the information in the PX-meter during the leafing-through procedure.

Two or more consecutive depressions of the C-key will always return the PX-meter to the base condition, i.e. all programming will be erased.

A single depression of the C-key when the display is showing ready condition or "PX-markers in $M_H$" will be disregarded.

Whilst "leafing through", the PX-meter may be placed in the P-position at any time, on condition that the information is complete in every programmed information condition.

4.2.2 Programming of the PX-meter for T-parking

In order that the PX-meter may be used in connection with T-parking facilities, it is essential that the permit memory of the PX-meter be programmed with the TX-number which relates to that parking space together with the associated conditions of parking.

When parking, it will be necessary for the PX-meter to show base condition or warning condition on the display when in the V-position.

Programming procedure

The S-key is depressed once, and the display will show the ready condition.

The PX-number is entered, and this will appear on the display.

The S-key is depressed once, and the display will show the ready condition.

No more numerical information may now be entered, and any further depressions of the number keys will be disregarded.

The points raised in section 4.2.1 "Programming of the PX-meter for S-parking" shall apply to the PR-condition, the hanging up of the PX-meter in the PX-position, and the use of the C- and S-keys.

4.3 PX-meter in P-position
4.3.1 S-parking

The case A- described below relates to the programming specified above in section 4.2.1.

| PX-meter program | | Shown on display in P-position | Charge code | Max time code | Max daily charge code | Time interval | Miscellaneous |
|---|---|---|---|---|---|---|---|
| 4.3.1.1 | Time intervals do not overlap each other. | | | | | | |
| A | 123.456 | 123.456 15.30 | 12 | 3 | | | Base condition after max. time exceeded. |
| B | 123.456 08.18 | 123.456 | 12 | 3 | | 08–18 | Every day |
| | | 000.000 | | | | 18–08 | Shown every day after max. time exceeded |
| C | 123.456 08.18 016.456 | 123.456 | 12 | 3 | | 08–18 | Every day |
| | | 000.000 | | | | | Shown every day after max. time exceeded |
| | | 016.456 | 01 | 6 | | 18–08 | |
| | | 000.000 | | | | | Shown every day after max. time exceeded |
| D | 123.456 08.18 016.456 18.22 | 123.456 | 12 | 3 | | 08–18 | Every day |
| | | 000.000 | | | | | At end of max. period |
| | | 016.456 | 01 | 6 | | 18–22 | |
| | | 000.000 | | | | | At end of max. period |
| | | 000.000 | | | | 22–08 | |
| E | 123.456 08.18 016.456 | | | | | | Same as case D PX-meter to base condition |
| F | 123.456 08.18 | 11.38 | | | | | |

| PX-meter program | Shown on display in P-position | Charge code | Max time code | Max daily charge code | Time interval | Miscellaneous |
|---|---|---|---|---|---|---|
| 18 . 22 | | | | | | Same as case D |
| G  123 . 456 | | | | | | but with |
| 08 . 18 | | | | | | charge code 02 |
| 026 . 456 | | | | | | instead of 01 |
| 18 . 22 | | | | | | |
| 4.3.1.2  Time intervals overlap each other | | | | | | |
| 128 . 456 | 128 . 456 | 12 | 8 | | 08–16 | Every day |
| 08 . 18 | | | | | | |
| 016 . 456 | 016 . 456 | 01 | 6 | | 16–20 | |
| 16 . 20 | | | | | | |
| | 000 . 000 | | | | 20–08 | |
| 128 . 456 | 128 . 456 | 12 | 8 | | 08–12 | Every day |
| 08 . 18 | | | | | | |
| 148 . 456 | 148 . 456 | 14 | 8 | | 12–14 | |
| | 128 . 456 | 12 | 8 | | 14–18 | |
| | 000 . 000 | | | | 18–08 | |
| 4.3.1.3  S-parking with different tariff numbers for Saturday and Sunday | | | | | | |
| 498 . 456 | 498 . 456 | 49 | ($8^1$) | | 08–18 | Mon–Fri |
| 08 . 18 | | | | | | |
| 676 . 456 | 676 . 456 | 67 | ($6^2$) | | 08–14 | Saturday |
| 08 . 14 | | | | | | |
| | 000 . 000 | | | | | Mon–Fri |
| | | | | | | 18–08 |
| | | | | | | Sat 14–20 |
| | | | | | | Sun 20–00 |
| | | | | | | Mon 00–08 |
| | | | | | | (1) Max. charge |
| | | | | | | 8 × $1 |
| | | | | | | = 8 dollars |
| | | | | | | (2) Max. charge |
| | | | | | | 6 × 0.5 |
| | | | | | | = 3 dollars |

5. PX-LX Interface (interface between PX-meter and LX-terminal)

5.1 PX-LX communication procedure

The LX-terminal emits a pulse train via cables. The high level is identified with active emitters in this case in order to eliminate the possibility of misunderstandings.

The pulses are approximately 130 ms in length and are separated by intervals of approximately 260 ms.

The registration of the communication occurs by means of the LX-terminal emitting a specific pulse train which is detected by the PX-meter and acknowledged via a cable. The acknowledgement must be given before the fourth pulse following the first complete pulse from the LX which is detected. The active emitter in the PX-meter is identified as high level.

The indicated times are target values. Once a response has been obtained from the PX-meter, the LX-terminal will cut off its pulse train as soon as possible. This may in turn be used as an acknowledgement to the PX-meter.

After it has been activated, the cable will remain in an active state for a number of ms which will then be determined.

In this way the LX-terminal is able to make use of PX-meters which are equipped with or without clock cables in the event of the reader being provided with one emitter and two receivers. The LX-terminal is also to distinguish the difference between PX-meters with or without clock cables. The LX-terminal is then capable of adapting its programming to suit the type of meter concerned.

The attempt at communication may be repeated a number of times if it is not approved by the PX.

The invention is, of course, not limited to the above exemplified embodiment, but can be modified within the scope of the following claims.

What is claimed is:

1. A parking system for vehicles comprising:

sign means for displaying coded information relating to at least one of the conditions of parking time, cost, payment and permission to park a vehicle in a parking space associated with the sign;

parking meter means having data entry means for entering at least some of the information displayed on said sign means, cipher indicator means for displaying the information entered on said data entry means, main memory means for receiving and storing a predetermined number of information segments, accounting memory means connected to selectively receive at least some of the information segments from said main memory means for storing the information segments so received, controller means for selectively transferring at least some of the information segments from said main memory means to said accounting memory means during the time period in which the vehicle is parked in the parking space in accordance with said displayed information, means for determining that said meter means is operating in accordance with the information displayed on said cipher indicator, and debit indicator means for indicating that said parking meter means is operating in accordance with the information displayed on said cipher indicator; and terminal means having means for connecting said parking meter means thereto for receiving and processing stored parking information.

2. The parking system of claim 1 wherein the information displayed by said sign means comprises a cipher having the maximum length of time the vehicle is permitted to remain parked in said parking space coded therein.

3. The parking system of claim 1 wherein the information displayed by said sign means comprises a cipher having the cost per unit time charged for parking the vehicle in said parking space coded therein.

4. The parking system of claim 1 wherein the information displayed by said sign means comprises a cipher having the cost charged for parking the vehicle in said parking space coded therein.

5. The parking system of claim 1 wherein the information displayed by said sign means comprises a cipher having the identity of who is to receive payment for the vehicle parking in said parking space coded therein.

6. The parking system of claim 1 wherein the information displayed by said sign means comprise a cipher having the identity of who is authorized to park in said parking space coded therein.

7. The parking system of claim 1 further comprising at least one additional accounting memory means connected to receive at least some of the information segments from said main memory for storing the information segments so received, the transfer of said information segments from said main memory means to said at least one additional accounting memory means being controlled by said controller means.

8. The parking system of claim 1 wherein said controller means includes an electronic timer.

* * * * *